United States Patent [19]

Kirchberg, Jr. et al.

[11] Patent Number: 5,034,876
[45] Date of Patent: Jul. 23, 1991

[54] REAL-TIME EVALUATION OF PWM INVERTER PATTERN SELECTION

[75] Inventors: Maurice A. Kirchberg, Jr., Dubuque, Iowa; Alexander Cook, Rockford, Ill.

[73] Assignee: Sundstrand Corporation, Rockford, Ill.

[21] Appl. No.: 580,277

[22] Filed: Sep. 10, 1990

[51] Int. Cl.⁵ .............................................. H02M 5/40
[52] U.S. Cl. ...................................... 363/97; 363/41; 363/131
[58] Field of Search ...................... 363/37, 41, 42, 96, 363/97, 98, 131, 132

[56] References Cited

U.S. PATENT DOCUMENTS 4,937,723 6/1990 Rozman et al. ........................ 363/97
4,961,130 10/1990 Kirchberg, Jr. ....................... 363/98

Primary Examiner—Steven L. Stephan
Assistant Examiner—Adolf Berhane
Attorney, Agent, or Firm—Whitham & Marhoefer

[57] ABSTRACT

A pulse-width-modulated inverter models the output response of the system for a given switching angle set under existent load and d.c. link conditions. Before implementation, a provisionally selected angle set is input to the model, which produces an output representative of system operation for the provisional selected set. The harmonics content of the model output is compared with criteria establishing maximally allowable amplitudes for the harmonics and the set is implemented only if the output meets the criteria.

5 Claims, 3 Drawing Sheets

0

REAL-TIME EVALUATION OF PWM INVERTER PATTERN SELECTION

BACKGROUND OF THE INVENTION

1. Field of the Invention

The present invention generally relates to pulse width modulated (PWM) inverters and, more particularly, to real-time method and apparatus for evaluating modulating patterns prior to implementation.

2. Description of the Prior Art

PWM inverters are employed to convert direct current (d.c.) to alternating current (a.c.). In many applications, it is important to carefully regulate the quality of the a.c. generated by the inverter. Accordingly, it is customary to define a point of regulation (POR) downstream of the inverter at which the voltage and current of the a.c. signal generated by the inverter is sampled. The sampled voltage and current would be used to select appropriate PWM switching patterns to minimize distortion at the POR. Based on the voltage and current sensed at the POR, an inverter controller selects or creates in real time an appropriate PWM pattern to ensure the least distortion at the POR. As real and reactive power factors of electrical loads coupled to the inverter change, the PWM patterns fed to the inverter are changed.

A PWM pattern comprises a set of switching transients which, when applied to a d.c. signal via an inverter, produces alternating pulses which, when filtered, approximates a sinusoidal a.c. signal. The pulses in a PWM pattern are of varying width.

Prior inventions have addressed schemes for controlling the harmonic content of the inverter output caused by changes in load parameters. Representative of such inventions is U.S. Pat. No. 4,527,226 to Glennon, which discloses an inverter control system for a PWM inverter circuit. This circuit comprises an angle set look up table and selection logic for addressing the look up table. The angle set defining the inverter output waveform is selected in response to various operating conditions of the inverter. However, considering the number of parameter values and the degree of regulation desired, the number of patterns which must be stored can be prohibitively large.

Additional prior art approaches to pattern generation include the following patents. An earlier patent to Glennon, U.S. Pat. No. 4,382,275, is directed to a PWM inverter having an output signal with reduced harmonic content, wherein a filtered fundamental PWM signal is summed with a controlled signal.

U.S. Pat. No. 4,595,976 to Parro, II discloses an inverter control which is an enhancement of the Glennon inverter control. More specifically, the table look up is implemented as a plurality of memories, one for each phase, each of which is subdivided into a plurality of memory blocks which store a number of bytes. Memory address decoding logic addresses a particular memory block in each memory in accordance with a control signal representing the desired waveform to be generated at each phase output. Thus, the Parro, II inverter control accomplishes individual phase regulation of the inverter output.

U.S. Pat. No. 4,635,177 to Shekhawat et al., discloses a further refinement of the basic Glennon inverter control system. More specifically, the Shekhawat et al., control permits on-line generation of PWM patterns for a neutral point clamped PWM inverter. A microprocessor and memory are coupled to the generating circuitry for calculating switching points for the inverter switches during operation of the inverter. Timer modules are coupled to the microprocessor for developing switch points so that the switches are operated to reduce the distortion of the inverter output signal.

U.S. Pat. No. 4,480,299 to Muto et al., also discloses a microprocessor controller inverter control. However, the Muto et al., PWM inverter is controlled by the use of the fundamental wave voltage of the inverter output as a feedback quantity. Muto et al. fail to show any apparatus for directly dealing with the physical limitations within the inverter itself.

Other patents related to the art of inverters include U.S. Pat. Nos. 3,648,150 to Kerick et al., and 4,626,979 to JaQuay. The Kerick et al., patent discloses an apparatus for comparing a filtered output of a PWM inverter with a reference waveform and generating output voltage signal to control the inverter drive circuit to produce an output waveform substantially duplicating the reference waveform. The JaQuay patent is similar to the Kerick et al. patent in that it is directed to a PWM inverter, including a comparator for comparing an output voltage with the sum of a reference voltage and a maximum allowable ripple voltage.

Also representative of the prior art are U.S. Pat. Nos. 4,646,221 to Sekino et al., 4,757,434 to Kawabata et al., 4,800,478 to Takahashi, and 4,757,432 to Hancock. The patent to Sekino et al., is directed to a controlling circuit which monitors the output waveform of the inverter and controls the firing of the switch elements in the inverter to restore it to a sinusoidal waveform in the event that it is distorted by nonlinear loads. The patent to Kawabata et al., is directed to a control circuit for a current control minor loop which monitors the instantaneous value of the output current of the power conversion apparatus and adjusts it to the current reference value. The patent to Takahashi is directed to a control for an inverter, wherein an evaluation function on the whole combination of the inverter and the load connected to the a.c. side of the inverter is minimized. The patent to Hancock is directed to a device for time integrating the difference between the electrical output and the reference by varying the switching frequency in the inverters so as to null the time integrated difference in a feedback control loop.

The co-pending applications set for above disclose additional techniques for selecting and/or generating switching patterns.

SUMMARY OF THE INVENTION

An object of this invention is the provision of a pulse-width-modulated inverter controller in which patterns selected to reduce output distortion are evaluated in real-time prior to implementation.

Briefly, this invention contemplates the provision of a pulse-width-modulated inverter in which switching angles are provisionally selected using prior art techniques or using techniques disclosed in the aforementioned co-pending applications. In accordance with this invention, the system includes apparatus which models the output response of the system for a given switching angle set under existent load and d.c. link conditions. Before implementation, the provisionally selected set is input to the model which produces an output representative of system operation for pattern. The harmonics content of the model output is compared with criteria and the pattern implemented only if the output meets these criteria.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
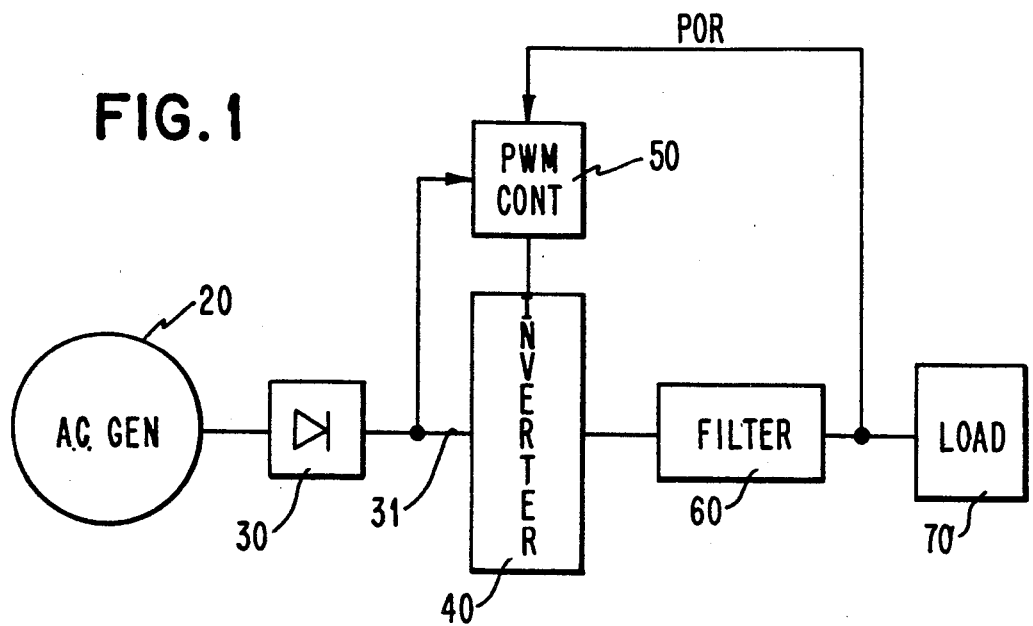
FIG. 1 is a block diagram of a variable speed constant frequency system embodying the invention.

Referring now to the drawings, and more particularly to FIG. 1, there is shown a block diagram of the variable speed constant frequency (VSCF) system embodying the present invention. A generator 20 is mechanically coupled to a variable speed prime mover (not shown) which may be, for example, an aircraft engine. The generator 20 produces power of a frequency which varies as a function of the speed of the prime mover. The resulting a.c. power produced by the generator 20 is therefore termed "wild frequency" a.c. power and is unsuitable for use by aircraft electrical systems or loads, which is the preferred environment for the operation of the VSCF system.

Accordingly, the VSCF system is designed to convert the "wild frequency" a.c. power produced by the generator 20 into constant frequency a.c. power, typically at a frequency in the range of 400 Hz, for use by aircraft electrical systems. "Wild frequency" a.c. power produced by the generator 20 is fed to a rectifier 30 which rectifies the a.c. power into positive and negative d.c. voltages. The d.c. voltages are produced on a d.c. link 31 having a positive d.c. rail and a negative d.c. rail. An inverter 40, under control of an inverter controller 50 produces, by pulse width modulation in the preferred embodiment, a PWM waveform from the d.c. voltages which is fed to a filter 60. The filter 60 smooths the PWM waveform produced by the inverter 40 into an approximation of a sinusoidal constant frequency a.c. output which is fed to the aircraft electrical loads 70.

In the preferred embodiment of the invention, the wild a.c. power output by the generator 20 is three-phase a.c. power. The constant frequency a.c. power generated by the inverter 40 and smoothed by the filter 60 is likewise three-phase. Signals indicative of the d.c. link voltage and the voltage and current at the filter output, (called the point of regulation or POR) are coupled to the controller.

Figure 2:
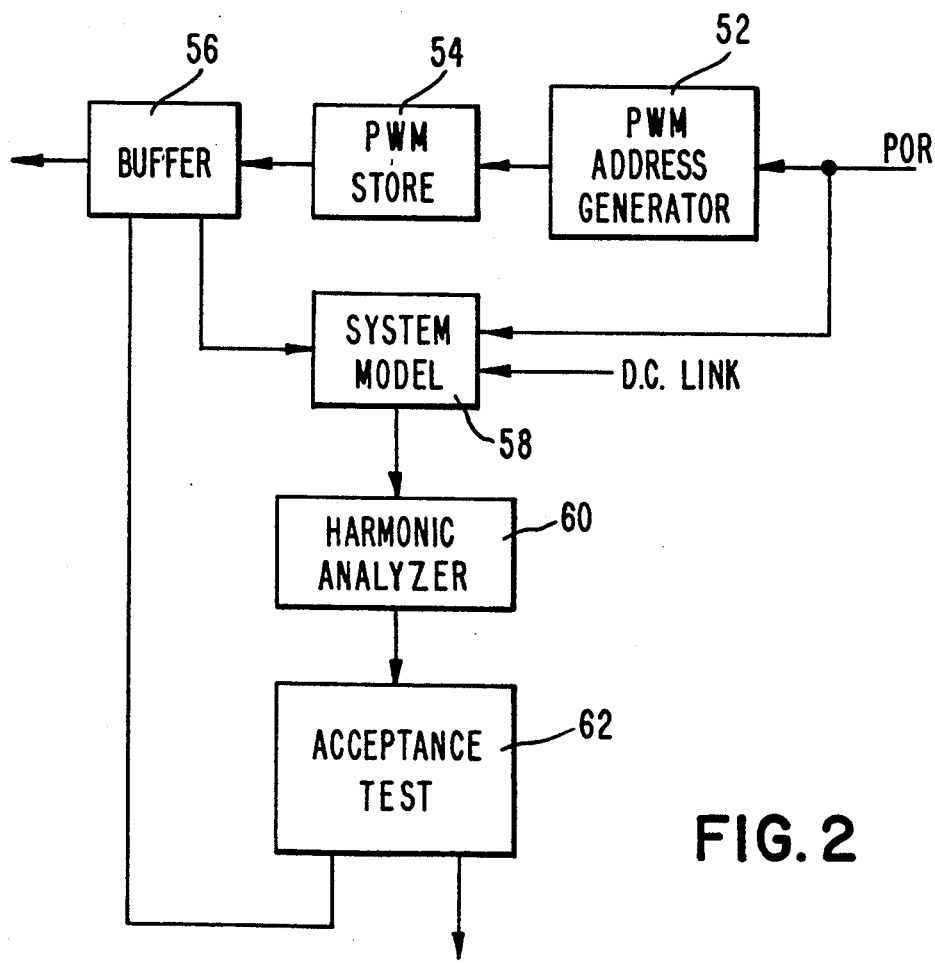
FIG. 2 is a block diagram of the PWM controller shown in FIG. 1.

Referring now to FIG. 2, the PWM controller 50 includes in this specific embodiment a PWM address generator 52 which, in response to POR conditions, generates an address to select one of the PWM pattern sets stored in a memory 54. It will be appreciated that this system for initially selecting a PWM pattern may be the same as that disclosed in the aforementioned Glennon patent. It will also be appreciated that other prior art systems for making an initial provisional selection may be used in the practice of this invention.

The PWM pattern provisionally selected is coupled to a buffer 56 but is not immediately implemented to control the inverter 40. The pattern stored in the buffer is coupled to a device 58 which models the operation of inverter 40. The d.c. link voltage and the POR parameters are also coupled as inputs to the model 58. The model 58 is designed to generate an output in response to these inputs which simulates the output of the inverter 40 for the same input conditions, including the provisionally selected switching pattern. Preferably the model has a fast response and may comprise analogue components or hard-wired digital logic components. While a software driven computer simulation of the inverter may be satisfactory for some applications, for many applications its response time would be too slow. The model may simulate operation of the inverter alone or preferably the inverter in combination with its output filter.

As will be explained in more detail in connection with FIG. 3, a analyzer 60 determines the amplitude of the harmonics for those harmonics of interest in the a.c. output of the model. The harmonic amplitudes are compared with predetermined criteria in a tester 62. If the individual harmonic amplitudes or the collective amplitudes or both are below the levels established by the test, an output from tester 62 to the buffer 56 causes the provisionally selected PWM pattern to be coupled to the inverter and thus implemented. If the amplitude(s) exceed the level(s) established by the criteria in tester 60, the pattern is not implemented. In this latter case, the system implementing the inversion may wait until another pattern is provisionally selected in response to a change in POR conditions. Alternatively, another pattern may be selected and model tested in response to the existing POR conditions. For example, potentially useful patterns may be stored in adjacent address locations, and the next location addressed in response to a pattern which does not meet the criteria established by the tester 60. Alternatively, corrections to the provisionally selected switching angle patterns may be calculated and implemented based upon the harmonic content of the model output in the manner described in copending application Ser. No. 07/503,377 filed Apr. 2, 1990, assigned to the same assignee as this application.

Figure 3:
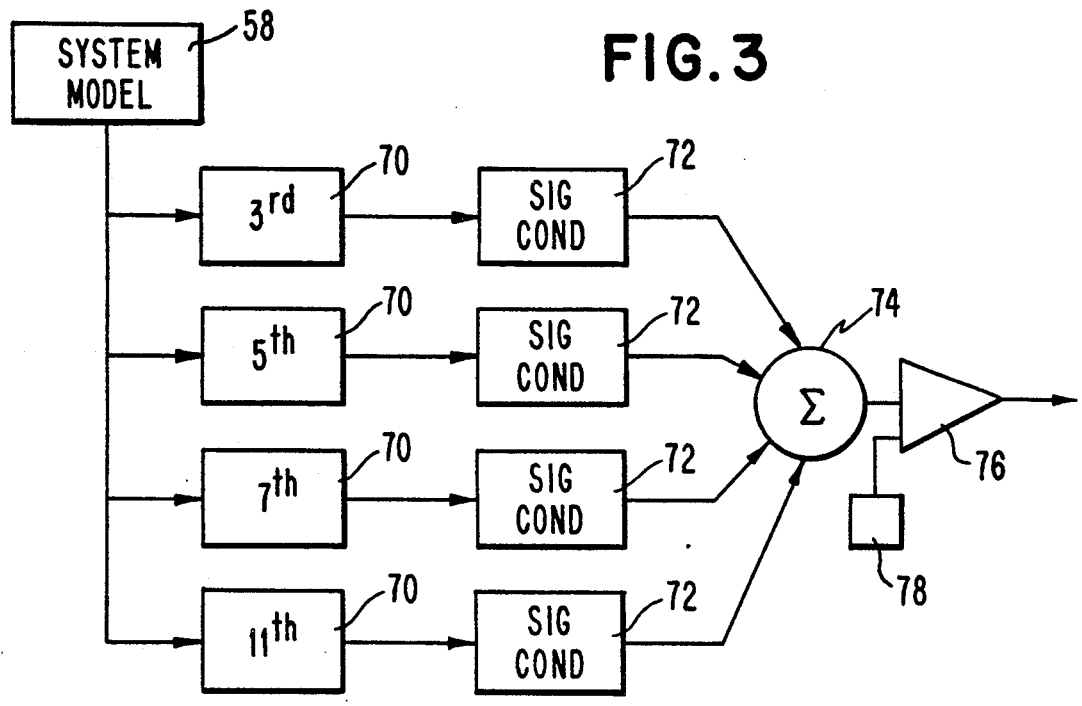
FIG. 3 is a block diagram of one embodiment for testing the model output.

Referring now to FIG. 3, the a.c. output of the model is coupled in parallel to the inputs of a series of harmonic analyzers each respectively designed to measure the amplitude of one of the harmonics of interest, in this example the odd harmonics 3 through 11. The analyzers may be implemented by a microprocessor programmed to digitally perform a Fast Fourier Transform for the harmonic of interest or alternatively an analogue analyzer such as disclosed in U.S. Pat. No. 3,745,317. In the specific embodiment of FIG. 3, signal conditioners 72 normalize and buffer store the amplitudes of all harmonic components of interest, which are summed at junction 74. A comparator 76 compares the sum to a reference 78. If the sum is less than the reference, an output from the comparator 78 causes the PWM switch angle set stored in buffer 56 to be implemented. If the sum is greater than the reference, the set in the buffer is not implemented.

Figure 4:
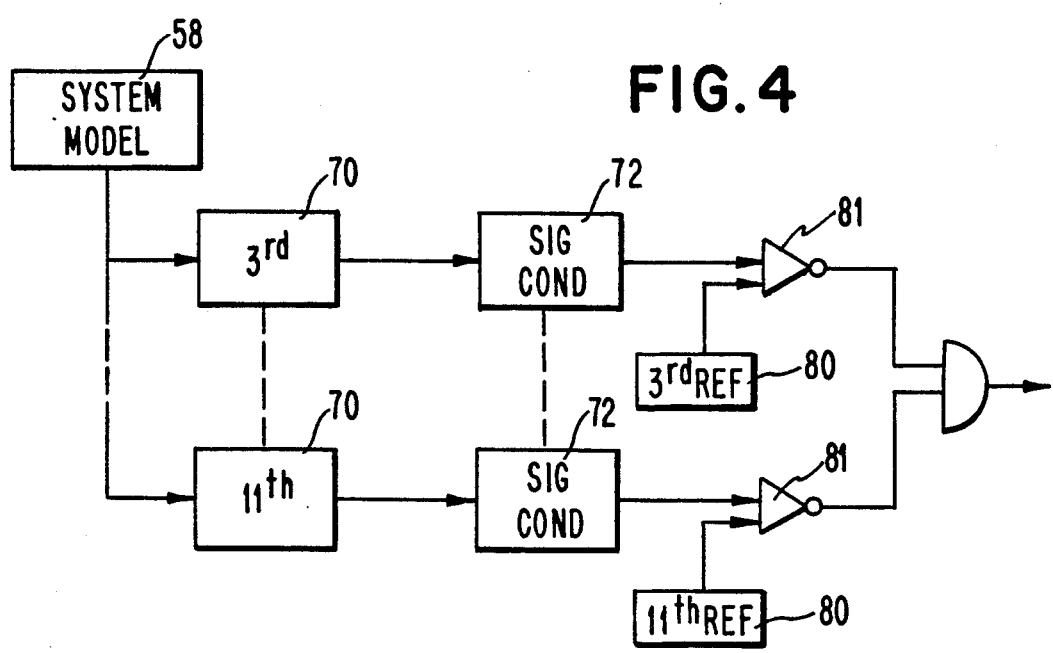
FIGS. 4 and 5 are block diagrams of other specific embodiments of the portion of the system shown in FIG. 3.

FIG. 4 illustrates another embodiment of the invention. Here a comparator 81 compares the magnitude of each of the harmonics to a reference 80 which may be a different reference for each harmonic and if any harmonic exceeds its reference, the provisional pattern stored in the buffer is not implemented.

Figure 5:
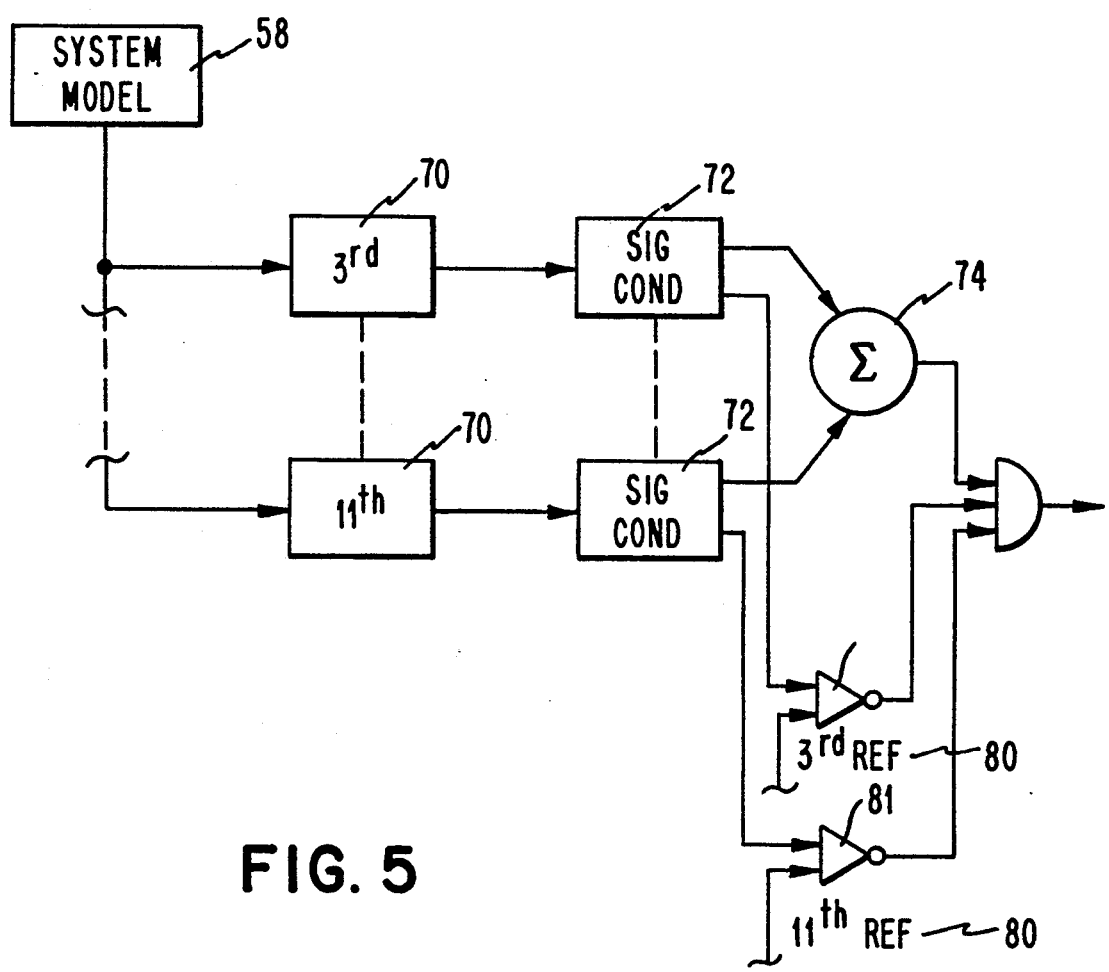

FIG. 5 is an embodiment of the invention in which the criteria explained in connection with FIGS. 3 and 4 both must be met in order to implement a provisionally selected pattern. The magnitude of each of the harmonics must be less an amount prescribed for that harmonic and the sum of the magnitude of all the harmonics must not exceed a certain value.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. In an aircraft power supply system in which an inverter is used to generate an a.c. power output from a d.c. link voltage, an inverter controller comprising in combination;
    means to provisionally select a set of pulse-width-modulating switching angles in response to an a.c. power output parameter;
    means to simulate the operation of said inverter in response to inputs of said d.c. link voltage, said a.c. output parameter, and said pulse-width-modulating switching angles, said means to simulate providing an a.c. output signal whose wave form simulates an output of said inverter in response to said inputs;
    means to couple said inputs to said means to simulate;
    means to analyze said a.c. output signal to determine the amplitude of any harmonic distortion of said a.c. output signal for at least one harmonic of interest;
    means coupled to said analyzing means to test the amplitude of any harmonic distortion for said harmonic of interest against a predetermined criteria; and
    means to couple said provisionally selected set of switching angles to said controller if said harmonic amplitude meets said criteria.

2. In an aircraft power supply system as in claim 1 wherein said means to analyze determines the amplitude of any harmonic distortion in said a.c. output for at least two harmonics of interest.

3. In an aircraft power supply system as in claim 1 wherein said predetermined criteria establishes maximum amplitude for the amplitude of said harmonic.

4. In an aircraft power supply system as in claim 2 wherein said predetermined criteria establishes a maximum sum of the amplitudes of the harmonics.

5. In an aircraft power supply system as in claim 2 wherein said criteria comprises a combination of a maximum amplitude for each harmonic and a maximum sum for all harmonics.

* * * * *